UNITED STATES PATENT OFFICE.

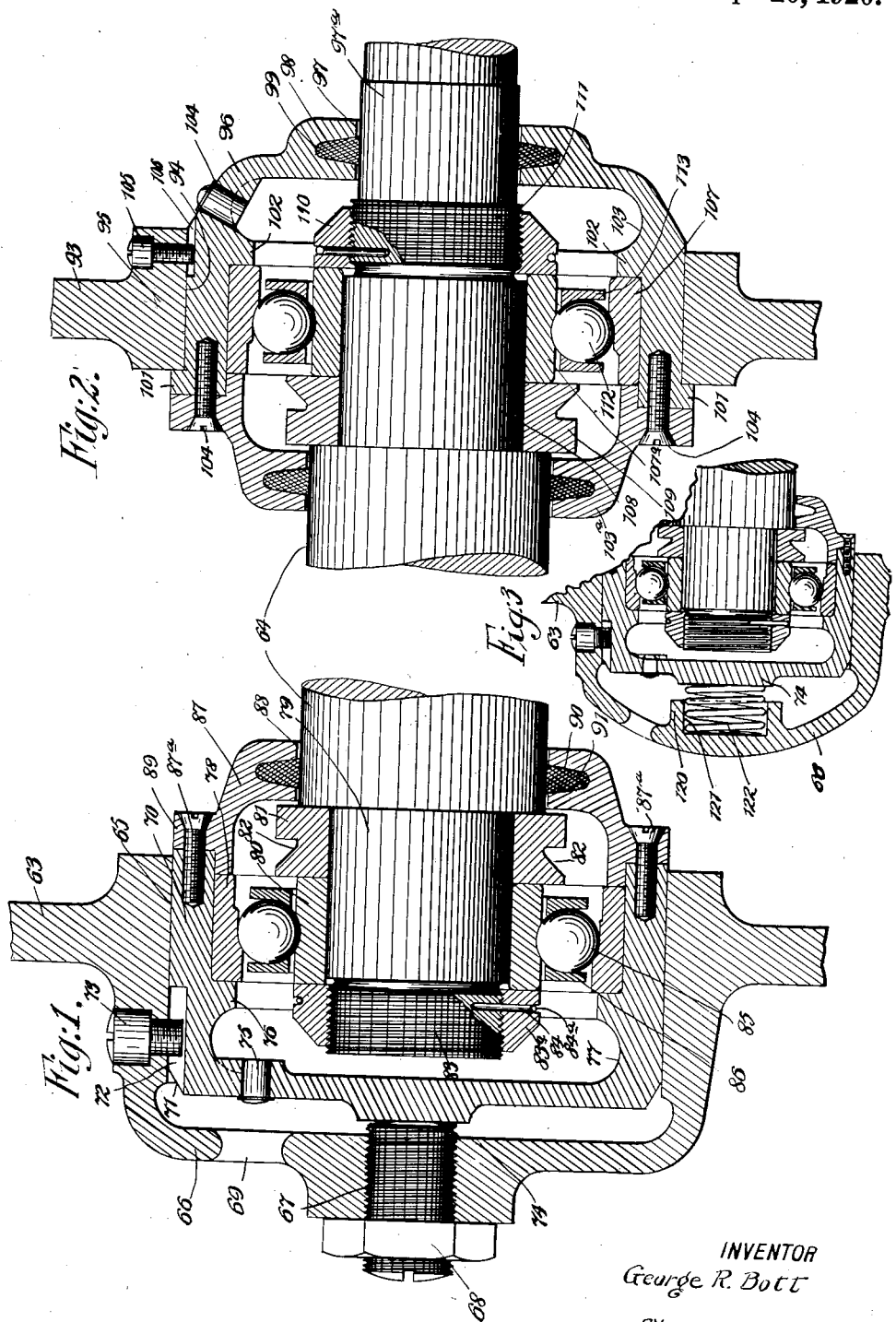

GEORGE R. BOTT, OF NEW YORK, N. Y., ASSIGNOR TO THE NORMA COMPANY OF AMERICA, A CORPORATION OF NEW YORK.

BEARING AND MOUNTING THEREFOR.

1,337,882. Specification of Letters Patent. Patented Apr. 20, 1920.

Application filed June 26, 1916. Serial No. 105,887.

*To all whom it may concern:*

Be it known that I, GEORGE R. BOTT, a citizen of the United States, and residing in the borough of Manhattan, city and State of New York, have invented certain new and useful Improvements in Bearings and Mountings Therefor, of which the following is a specification.

The present invention relates to improvements in bearings and mountings therefor, and has for its object to provide improved means for mounting any type anti-friction means, in such manner that the mounting will constitute a separate and removable bearing unit from the bearing support, to the end that the assembling and disassembling of the shaft from the supports is greatly facilitated, without in any way affecting the proper adjustment of the bearings, and with the additional advantage that the lubricant remains undisturbed. A further object is to provide in such mountings improved lubricating means, by means of which the lubricant will be directed with the greatest effect.

With these and other objects in view my invention is shown in the accompanying drawings, and will be hereinafter more fully described with reference thereto, and finally pointed out in the claims.

In the accompanying drawings.

Figure 1 is a sectional view of the bearing and mounting at the closed end of the shaft, Fig. 2 is a similar view of the bearing at the shaft extended end, and Fig. 3 is a sectional fragmentary view reduced in size, showing a modified form of adjusting means.

Similar reference characters indicate corresponding parts throughout the several figures of the drawings.

Referring to the drawings, and more particularly to Fig. 1 thereof, the end plate 63 at the closed end of the shaft 64 which may form part of a support like, for instance, in a generator or motor, is provided centrally with a cylindrical bore 65, closed at its exterior end by an integral closure 66, centrally of which there is provided a set screw 67 and a lock nut 68 thereon, for adjusting the bearing as hereinafter more fully described. An oil opening 69 is also provided in said closure. A bearing housing 70 closed at one end, slidably engages the bore of the plate 63, being beveled at its edge 71 to facilitate insertion in the bore. A key way 72 is provided in the housing which is engaged by a set screw 73 in the plate. The closed end of the housing is provided centrally with a thickened portion 74, which forms a seat for the adjusting screw 67, provided with a lock nut 68, and opposite the opening 69 there is provided an oiling plug or valve 75, which permits subsequent oiling of the bearing through the said opening. The screw 67 forms a permanent adjustment to prevent axial play, in that the same is permanently adjusted in the proper position at the original assembling, and after adjustment is locked in place by the nut 68. When disassembling the shaft as hereinafter more fully described, this adjustment need not be disturbed. A shoulder 76 is provided interiorly of the housing 70, the surface between the closed end and the shoulder being curved as at 77. The outer race 78 of the bearing is fitted into the housing and abuts against the shoulder 76. The shaft 64 is contracted at its end 79, the inner race 80 being mounted thereon. A spacer or collar 81 is provided on the shaft between the inner ball race, and the shoulder of the contracted portion, being provided with an annular recess 82 having an inclined wall in the direction of the bearing which surface serves as an oil throw when rotating. The end of the contracted portion of the shaft is threaded as at 83 and a locking ring 83ª is screwed thereon for securing the inner race in position. This ring is locked in place by a wire ring 84ª, bent in at its end 84, and inserted into a recess in the ring and threaded portion 83. The balls 85 and cage 86 are placed between the inner and outer races. The bearing may be of any type, that is either ball or roller bearings may be employed. A cap 87 provided with a bore 88 is secured to the open end of the housing by screws 87ª, passing through a flange 89 thereof, the end of the cap fitting into the housing and abutting the outer ball race. The bore is provided with a recess 90 in which is placed a felt ring 91, which engages the surface of the shaft 64.

At the extended end of the shaft (Fig. 2), the plate 93 is provided with a central opening 94, the portion of the plate surrounding the opening being enlarged as at 95. A housing 96 is secured in the bore of the plate. The said housing is open at its inner end, and at the other end is bulged outwardly and is provided with a bore 97, which engages the bearing portion 97ª of the shaft beyond which the pulley is mounted. A felt ring 98 is provided in a recess 99 which engages the shaft, thus forming a seal in the housing for retaining lubricant, and excluding foreign matter from entering the housing or bearing. A shoulder 101 is provided exteriorly at the inner end of the housing, which engages the enlarged portion 95 of the end plate to prevent movement outwardly of the housing, and interiorly there is provided an abutment shoulder 102 engaging the side of the outer race. The portion of the housing between the shoulder 102 and the closed end is rounded as at 103 to form an annular oil reservoir to which oil is supplied through a valve 104. The housing is prevented from turning by a set screw 105 of the portion 95, engaging a key-way 106 of the housing, and which permits the plate 93 to be moved outwardly from the housing.

The outer ball race 107 is disposed between the shoulder 102 and the cap 103ª, secured to the inner end of the housing by screws 104, and surrounding the shaft 64. The inner ball race 107ª is mounted on the reduced portion 108 of the shaft, and is held between the spacing and oil throw ring 109, and a locking ring 110 screwed upon the threaded portion 111 of the shaft. The anti-friction balls 112 and ball retainer 113 are disposed between the inner and outer races. It will be noted that the cap, bearing, spacing and oil throw and locking ring are similar in form to the corresponding members at the closed end of the shaft.

In dismounting this form of my invention for any purpose whatsoever, where the shaft and bearing housings proper are withdrawn, the plate 93 is first disengaged from its support, whereupon the shaft with the bearings may be moved away from the plate 63. The bearings and housings are assembled as units upon the shaft, and in this way the alinement remains true, and the lubricant in the bearing housing undisturbed as it is unnecessary to touch the bearings proper. This construction prevents the possibility of the outer race becoming disengaged from the inner race when assembling or disassembling of major units. The mounting of the bearing is thereby greatly facilitated, as it is unnecessary to touch the same after assembling, being entirely enveloped and mounted as a unit, as above pointed out.

The bearings may if desired, be removed by disassembling the housings 70 and 96 from the caps 87 and 103ª, by removal of the screws, the inner ball races being removable from the shaft by removal of the locking rings therefrom.

The clearance spaces in the bearing housing provide means for copious and oil well lubrication, and the grooves of the separator rings serve to move the lubricating medium in the right direction during rotation of the shaft.

In Fig. 3 I have shown a slightly modified form of construction in which the end 66 of the support 63 is provided with a smooth and rounded outer surface, and interiorly is provided with an inwardly extending cylindrical portion 120 forming a recess 121, in which is disposed a spring 122, the end of this spring bearing against the enlarged portion 74 of the bearing housing. This construction provides an automatic adjustment at all times to prevent axial play.

I have illustrated preferred and satisfactory forms of my invention, but it is obvious that changes may be made therein within the spirit and scope thereof as defined in the appended claims.

I claim:

1. In a bearing, the combination with a shaft and an end plate, provided with an opening therein of anti-friction means on said shaft, housing means entirely inclosing said anti-friction means circumferentially and endwise, said housing means and anti-friction means adapted to be assembled as a unit upon said shaft, said housing means adapted to engage said opening of said end plate and have sliding movement therein when said end plate is fixed.

2. In a bearing, the combination with a shaft and an end plate provided with a circular opening therein, of antifriction means on said shaft, housing means entirely inclosing said means, circumferentially and endwise, said housing means and anti-friction means adapted to be assembled as a unit upon said shaft, said housing means adapted to engage said opening of said end plate and have sliding movement therein when said end plate is fixed, and means for preventing rotation of said housing.

3. In a bearing, the combination with a shaft and an end plate provided with an opening therein, of anti-friction means on said shaft, housing means entirely inclosing said means circumferentially and endwise, said housing means and anti-friction means adapted to be assembled as a unit upon said shaft, said housing means adapted to engage said opening of said end plate and have sliding movement therein when said end plate is fixed, and means for longitudinally adjusting said shaft and housing.

4. In a bearing, the combination with a shaft and an end plate, provided with a circular bore closed at one end, of anti-friction means on said shaft, and housing means entirely inclosing said anti-friction means circumferentially and endwise, said housing means and anti-friction means adapted to be assembled as a unit upon said shaft, said housing means adapted to engage the bore of said end plate and have sliding movement therein when said end plate is fixed, and means carried by said closed end adapted to longitudinally adjust said shaft and housing.

5. In a bearing, the combination with a shaft and bearing support, provided with a circular bore closed at one end, of anti-friction means on said shaft, and housing means entirely inclosing said anti-friction means, said housing means and anti-friction means adapted to be assembled as a unit upon said shaft, said housing means adapted to slidably engage the bore of said support, and a spring disposed between said closed end and said housing and adapted to longitudinally adjust said shaft and housing.

6. In a bearing, the combination with a shaft and an end plate, of anti-friction means on said shaft, means for retaining said anti-friction means on said shaft, spacing means on said shaft provided with oil directing means, and housing means entirely inclosing said anti-friction means, said housing means and anti-friction means adapted to be assembled as a permanent unit upon said shaft for insertion in said end plate and adapted to have sliding movement relatively to said end plate when said end plate is fixed.

7. In a bearing, the combination with a shaft, and bearing supports at each end thereof of anti-friction means at each end of said shaft, housing means entirely inclosing said anti-friction means, adapted to be assembled as a unit upon said shaft for insertion in said support, one of said housings being provided with means for preventing movement outwardly from its respective support, both of said housings adapted to be moved inwardly with respect to said supports, and adjusting means on the other of said supports, adapted to adjust said housings containing bearings.

8. In a bearing, the combination with a shaft, and bearing supports at each end thereof of anti-friction means at each end of said shaft, housing means entirely inclosing said anti-friction means, adapted to be assembled as a unit upon said shaft for insertion in said support, one of said housings being provided with means for preventing movement outwardly from its respective support, both of said housings adapted to be moved inwardly with respect to said supports, and adjusting means on the other of said supports adapted to adjust automatically said housings containing bearings.

In testimony that I claim the foregoing as my invention, I have signed my name in presence of two subscribing witnesses.

GEORGE R. BOTT.

Witnesses:
A. H. GRAYBURN,
H. C. DU FRESNE.